(12) United States Patent
Drew et al.

(10) Patent No.: US 8,517,146 B2
(45) Date of Patent: Aug. 27, 2013

(54) HOSE CAP COUPLER AND CLIP

(75) Inventors: Christopher J. Drew, West Allis, WI (US); Paul A. Leech, Fox Point, WI (US); David W. Procknow, Elm Grove, WI (US); Steven R. Schlosser, Fond du Lac, WI (US); John H. Theirmann, Greenfield, WI (US); Jessica S. Wobschall, Milwaukee, WI (US); Robert C. Pomeroy, Jackson, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 1016 days.

(21) Appl. No.: 12/243,931

(22) Filed: Oct. 1, 2008

(65) Prior Publication Data

US 2010/0078265 A1     Apr. 1, 2010

(51) Int. Cl.
*F16L 55/115*     (2006.01)
(52) U.S. Cl.
USPC ............................................. 184/1.5; 138/89
(58) Field of Classification Search
USPC .......................................... 184/1.5; 123/196
See application file for complete search history.

(56) References Cited

U.S. PATENT DOCUMENTS

| | | | |
|---|---|---|---|
| 1,629,835 A * | 5/1927 | Montan ........................... 24/11 R |
| 2,966,320 A * | 12/1960 | Schoepe et al. .................. 248/75 |
| 3,103,947 A | 9/1963 | Mueller |
| 3,235,209 A * | 2/1966 | Seckerson et al. ............... 248/73 |
| 3,731,717 A * | 5/1973 | Potash ........................... 141/379 |
| 3,867,999 A | 2/1975 | Cox |
| 3,927,783 A * | 12/1975 | Bogert ........................... 215/222 |
| 4,033,432 A | 7/1977 | Bernstein |
| 4,402,420 A * | 9/1983 | Chernack ....................... 220/266 |
| 4,403,466 A | 9/1983 | Tillotson et al. |
| 4,406,435 A * | 9/1983 | Anderson ...................... 248/261 |
| D280,802 S * | 10/1985 | Cho ................................ D9/446 |
| D297,112 S * | 8/1988 | Holdaway ...................... D8/395 |
| 4,875,884 A | 10/1989 | Meisenburg |
| 4,977,978 A | 12/1990 | Batrice |
| 5,074,379 A | 12/1991 | Batrice |
| 5,131,497 A | 7/1992 | Rogers |
| D348,645 S * | 7/1994 | Hitchcock et al. ........... D12/197 |
| 5,386,881 A | 2/1995 | Eshelman |
| 5,411,114 A | 5/1995 | Bedi et al. |
| 5,467,746 A | 11/1995 | Waelput |
| 5,487,447 A | 1/1996 | Martinez Velazquez |
| 5,680,954 A * | 10/1997 | Arnold et al. .................. 220/300 |
| 6,003,635 A | 12/1999 | Bantz et al. |
| 6,145,623 A | 11/2000 | Cordes |
| D435,444 S * | 12/2000 | Newville et al. ............... D9/446 |
| 6,393,905 B1 | 5/2002 | Steele |
| 6,755,704 B1 | 6/2004 | Leinonen |
| D618,345 S * | 6/2010 | Baker et al. .................. D24/134 |

* cited by examiner

*Primary Examiner* — William A Rivera
*Assistant Examiner* — Michael Riegelman
(74) *Attorney, Agent, or Firm* — Rathe Lindenbaum LLP; Ken Lemke

(57) ABSTRACT

An apparatus includes a hose cap coupler, a cap removably coupled to the cap coupler and a clip supported by at least one of the cap and the coupler. The clip is configured to retain the cap coupler to an engine or other portions of an implement.

24 Claims, 16 Drawing Sheets

HOSE CAP COUPLER AND CLIP

BACKGROUND

In many devices, such as small engines, it may be important to periodically drain and replace a fluid, such as oil. With such existing devices or small engines, draining the fluid is often tedious and time-consuming. For example, accessing a drain port of the engine may be difficult. During such draining, the fluid is subject to spillage, creating an undesirable mess.

DETAILED DESCRIPTION OF THE EXAMPLE EMBODIMENTS

Figure 1:
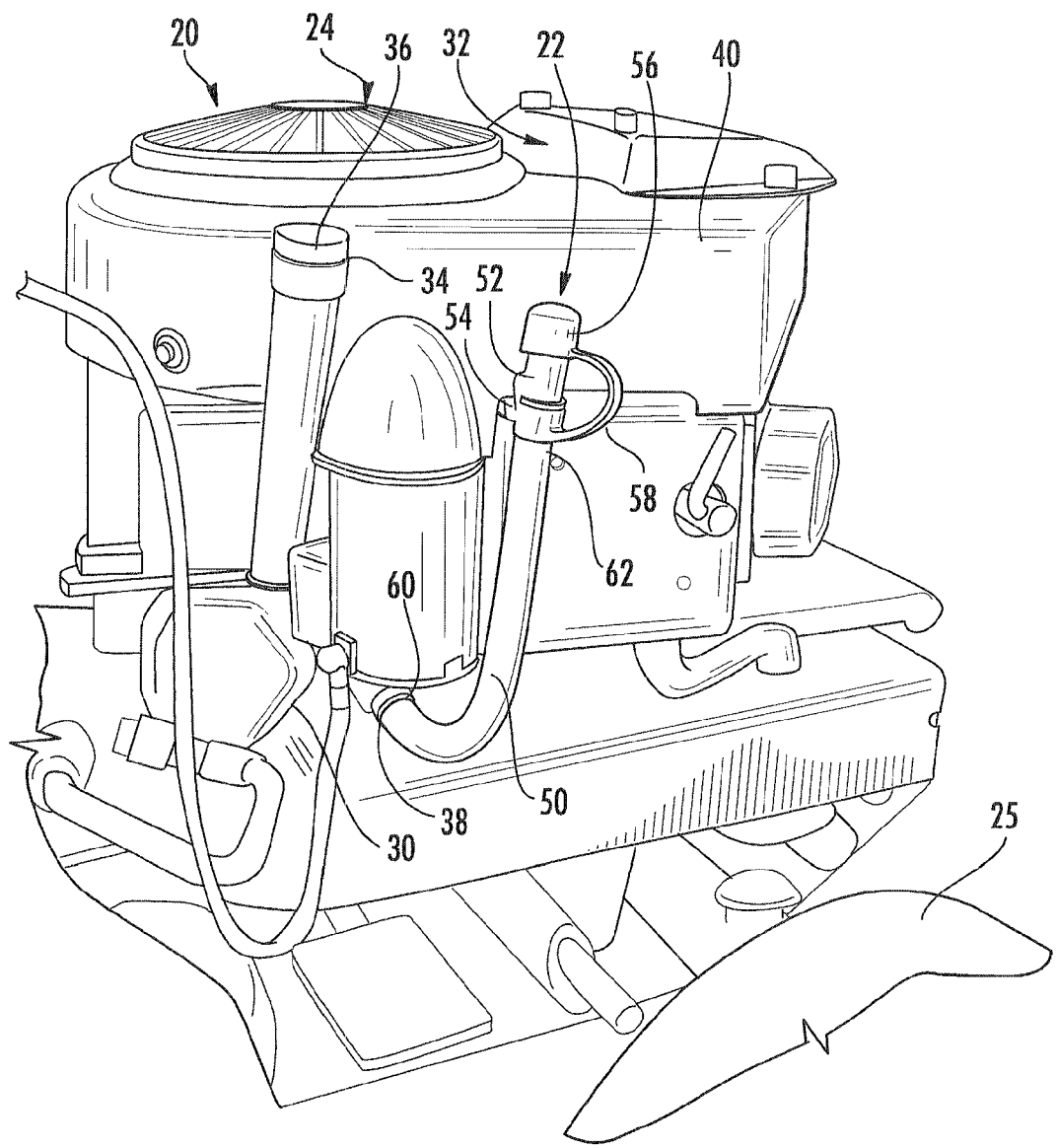
FIG. 1 is a side perspective view of a powered implement including a fluid drain system according to an example embodiment.

FIG. 1 illustrates one example of a powered implement 20 including fluid drain system 22. In the example illustrated, fluid drain system 22 facilitates the draining of a lubricating fluid, such as oil, from engine 24 of implement 20. In other embodiments, fluid drain system 22 may be used in other applications for draining other types of fluid from engine 24 or for draining other types of fluid from other components of implement 20. As will be described hereafter, fluid drain system 22 facilitates the draining and removal of oil from engine 24 in a less time-consuming (tool-less) and tedious manner and with less potential spillage of the oil. Fluid drain system 22 achieves such benefits with a less complex and costly mechanism.

Powered implement 20 may comprise any of a variety of power implements in which an engine, such as engine 24, is used to supply power for driving one or more working members, such as blades, augurs, tines and the like. In some embodiments, engine 24 may be additionally used to drive one of more driving wheels or tracks for facilitating travel of the powered implement. Examples of powered implements include, but are not limited to, walk behind or self-propelled snow throwers, lawnmowers, garden tractors, zero-turn mowers, generators, pressure washers, water pumps, chippers/shredders, edgers, cultivator or tillers, and aerators. In other embodiments, powered implement 20 may comprise any implement which utilizes some sort of fluid or liquid that must be replaced or drained.

Engine 24 comprises a machine that converts an energy source into mechanical power or motion for powering or driving a driven member, such as the wheel 25 shown or another working member, such as a blade, transmission, etc. In one embodiment, engine 24 comprises a small internal combustion engine such as those commercially available from Briggs & Stratton of Wauwatosa, Wis., such as single cylinder vertical shaft engines: M21, M28, M31, M33; V-twin vertical shaft engines, M40, M44, M49. In other embodiments, engine 24 may alternatively comprise a horizontal shaft engine or smaller engines sold or manufactured by Briggs & Stratton or others. In the example illustrated, engine 24 includes an oil reservoir 30 and a housing 32. Oil reservoir 30 comprises a tank, chamber or other structure configured to contain lubricating liquid or oil for lubricating engine 24. Reservoir 30 includes a fill port 34, a dipstick 36 and a drain port 38.

Fill port 34 provides an opening in fluid communication or fluidly coupled with an interior of reservoir 30 through which lubricating liquid or oil may be poured into reservoir 30. Fill port 34 generally faces in a vertical and upward direction (when implement 20 is in a normal operating orientation as shown). Dipstick 36 comprises a measuring device configured to be inserted through port 34 into reservoir 30 indicating a level of oil within reservoir 30. Dipstick 36 further serves as a cover for closing port 34. In other embodiments, reservoir 30 may alternatively include separate ports for the filling of reservoir 30 and the monitoring of the oil level within reservoir 30.

Drain port 38 comprises an opening in fluid communication with an interior of reservoir 30 through which lubricating liquid or oil may be drained from reservoir 30. Drain port 38 is located proximate to a floor or bottom end of reservoir 30 to facilitate substantially complete draining of oil from reservoir 30. As shown in FIG. 1, locating drain port 38 proximate to a floor or lower end of reservoir 30 may result in drain port 38 being difficult to visibly see or access.

Housing 32 comprises one or more structures covering, enclosing or shielding a portion of engine 24. In the example illustrated in which engine 24 includes a blower (not shown), housing 32 includes a portion 40 (sometimes referred to as a blower housing) extending about the blower. Housing 32 includes additional portions which shield other parts of engine 24 for aesthetic reasons or for safety reasons. Some portions of housing 32 may provide a portion of the outer structure of functional components of engine 24. As will be described hereafter, fluid drain system 22 releasably mounts to housing 32 and in particular, to blower housing 40. In other embodiments, fluid drain system 22 may alternatively mount to the engine shields, decorative shrouds, control brackets and the like. Although fluid drain system 22 releasably mounts to an existing structure of engine 24, housing 32, reducing modification costs, in other embodiments, fluid drain system 22 may releasably mount to other portions of engine 24 or other structures of engine 24 specifically provided for the mounting of fluid drain system 22, or a mounting boss specifically constructed on the engine such as an attachment boss and the like. In still other embodiments, fluid drain system may be mounted to other parts of implement 20 besides engine 24 or its housing 32.

Fluid drain system 22 facilitates draining of liquid or oil from reservoir 30. Fluid drain system 22 includes hose 50, hose cap coupler 52, clip 54, cap 56 and tether 58. Hose 50 comprises an elongate tube, at least a portion of which is flexible, bendable, rotatable or otherwise movable. As shown by FIG. 1, hose 50 has a first end 60 connected to drain the port 38 of reservoir 30 and a second opposite end 62 connected to hose cap coupler 52. In the example illustrated, a rigid fitting (such as a hose barb, bead, tube, threaded fitting, clamp fitting and the like) is inserted into end 60 of hose 50 to facilitate its connection to drain port 38. In other embodiments, hose 50 may be connected to drain port 38 in other fashions.

Hose 50 is sufficiently bendable such that hose 50 may be bent from the position shown in FIG. 1 in which end 62 extends or faces in an upward direction and another position in which end 62 faces in a substantially sideways or downward direction at or below a height of drain port 38. In the example illustrated, hose 50 comprises a tube of substantially uniform construction throughout its length from end 60 to end 62. In other embodiments, hose 50 may comprise two or more coupled segments, wherein different segments in series between end 60 and end 62 that have different levels of bendablity or flexibility.

Figure 2:
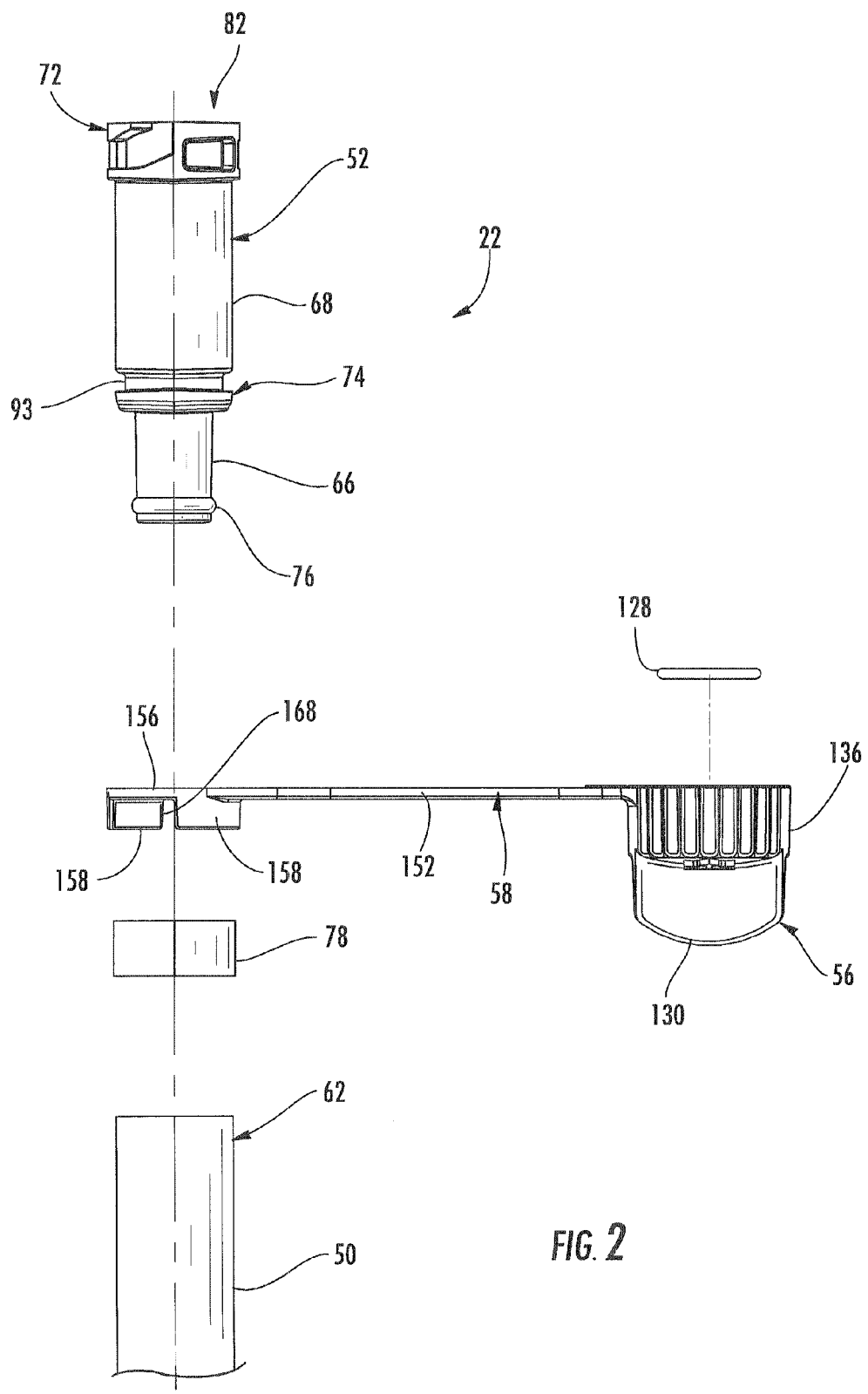
FIG. 2 is an exploded side elevational view of the fluid drain system of FIG. 1.
Figure 3:
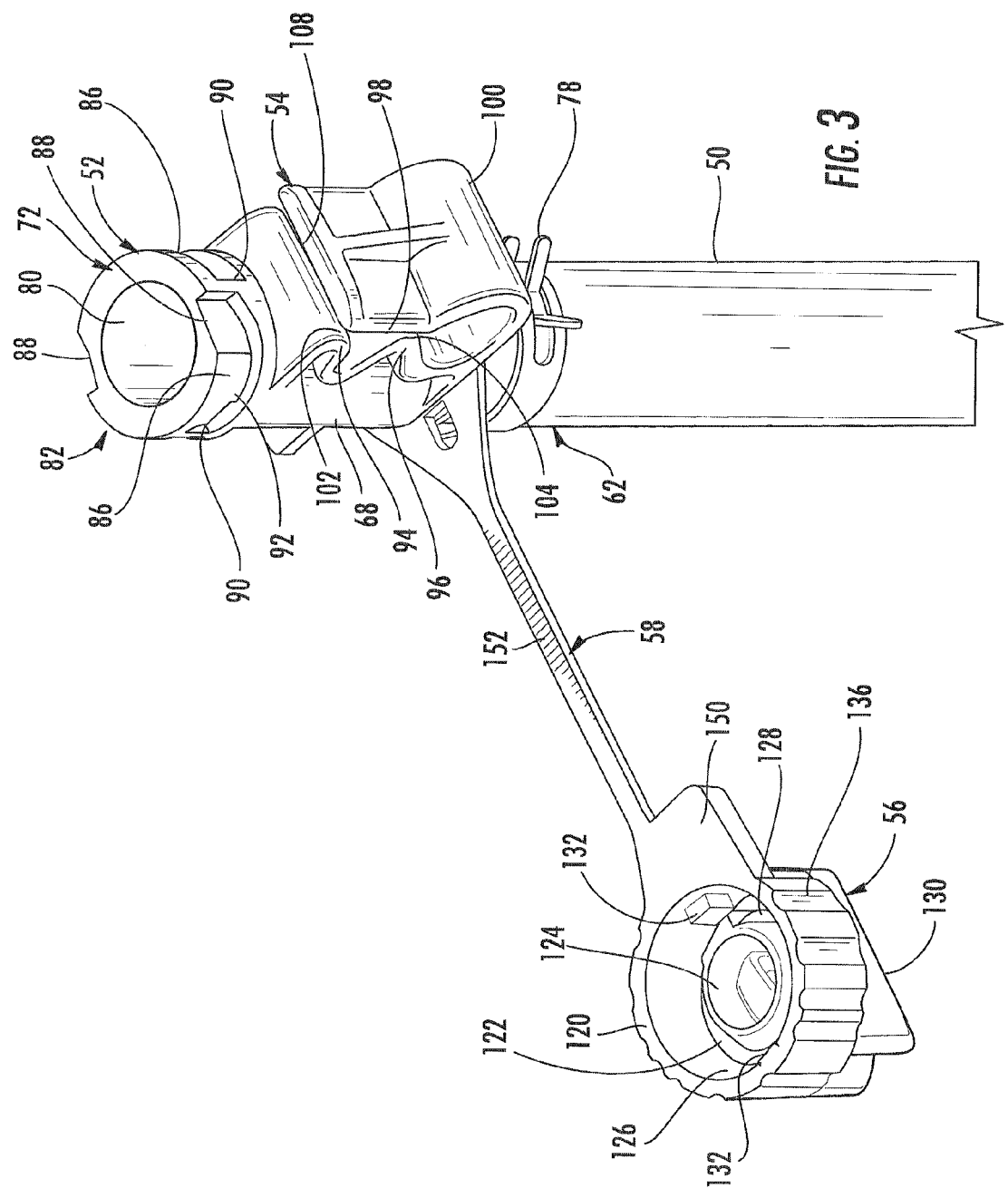
FIG. 3 is a top perspective view of the fluid drain system of FIG. 1 illustrating a cap separated from a hose cap coupler of the fluid drain system.

Hose cap coupler 52, clip 54, cap 56 and tether 58 of fluid drain system 22 are shown in more detail in FIGS. 2 and 3. FIG. 2 is a fragmentary exploded side elevational view of fluid drain system 22. FIG. 3 is a fragmentary perspective view of fluid drain system 22 with cap 56 removed from cap coupler 52 and suspended by tether 58. As shown by FIGS. 2 and 3, hose cap coupler 52 is connected or coupled to hose 50 and serves as a coupling interface for at least cap 56. In other words, coupler 52 facilitates the coupling, securement or retention of the cap 56 to end 62 of hose 50 such that cap 56 may close end 62 of hose 50.

For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members. The term "fluidly coupled" shall mean that two or more fluid transmitting volumes are connected directly to one another or are connected to one another by intermediate volumes or spaces such that fluid may flow from one volume into the other volume.

In the example illustrated, coupler 52 also serves as a coupling interface for tether 58. Coupler 52 connects tether 58 to end 62 of hose 50. In other embodiments, tether 58 may alternatively be directly connected to hose 50. Hose cap coupler 52 includes hose fitting 66 (shown in FIG. 2), fluid passage body 68, cap retainer 72, and tether mount 74 (shown in FIG. 2).

Hose fitting 66 extends from fluid passage body 68 and interfaces with end 62 of hose 50. In the example illustrated, fitting 66 is configured to extend into end 62 of hose 50 to form a fluid seal. Fitting 66 includes an internal fluid passage or fluid passage in connection with a fluid passage provided by fluid passage body 68. In the example illustrated, fitting 66 includes an external circumferential bead 76 which deforms at least an inner circumferential wall or surface of hose 50 when fitting 66 is inserted into hose 50 to retain fitting 66 in end 62 of hose 50. As shown by FIG. 3, end 62 of hose 50 is further secured to seal against fitting 66 with a clamp 78. In other embodiments, clamp 78 may be omitted or other structures such as hose barbs, beads, straight fittings, threaded connections, various clamps and the like may be used to secure fitting 66 to end 62 of hose 50.

Fluid passage body 68 extends between fitting 66 and cap mount 72. Fluid passage body 68 forms a fluid passage or fluid passage 80 projecting beyond end 62 of hose 50 when fitting 66 is inserted into end 62 of hose 50. Fluid passage body 68 supports clip 54.

Cap mount 72 comprises that portion of coupler 52 configured to secure and retain cap 56 to end 82 of coupler 52 over and across fluid passage 80 to close off a fluid passage 80 and the interior of hose 50. In the example illustrated, cap mount 72 includes a pair of diametrically opposite circumferentially channels 86, each channel 86 having an axial axis opening 88, a detent 90 and a ramp 92. As will be described in more detail hereafter with a discussion of cap 56, channels 86 along with their axial openings 88, detents 90 and ramps 92 facilitate secure retention of cap 56 on end 82 while providing a person with a distinct feel (and potentially a distinct sound or click), indicating when cap 56 is fully connected to coupler 52.

In the sample embodiment illustrated, fluid passage body 68 and cap mount 72 are shaped and sized such that at least end 82 of coupler 56 may be inserted into the mouth of a bottle or receptacle such as, for example, a drink bottle, a sports beverage bottle, a 2 liter soda bottle, or a standard milk jug such as a 1 gallon or half gallon milk jug. In one embodiment, end 82 of coupler 52 has a maximum diameter of 1⅛ inches. In other embodiments, end 82 of coupler 52 has a maximum diameter of about between 2-3 inches. As a result, such milk jugs may be used for transporting waste oil. In other embodiments, end 82 of coupler 52 may have other shapes and dimensions.

As best shown by FIG. 2, tether mount 74 comprises one or more structures configured to rotationally support tether 58 and to secure tether 58 and the remainder of cap coupler 52. In the example illustrated, tether mount 74 comprises a circumferential channel 93 configured to receive an end of tether 58 comprising a ring 156. Tether mount 74 extends between fitting 66 and fluid passage body 68 so as to be spaced from cap mount 72 by fluid passage body 68, allowing tether 58 to have a greater length for enhanced range of motion for tether 58 and cap 56.

In the example illustrated, tether mount 74 additionally includes tab or projection 164 shown in FIGS. 11-14. As will be described hereafter with respect to FIGS. 6 and 11-14, projection 164 of tether mount 74 cooperates with tether 58 to limit the extent to which tether 58 may be rotated relative to cap coupler 52. In other embodiments, tether mount 74 may have other configurations or may be omitted.

Clip 54 comprises a structure coupled to fluid passage body 68 (or another portion of hose cap coupler 52) that is configured to clip or otherwise removably retain hose cap coupler 52, and end 62 of hose 50 to another portion of implement 20 in a desired position and orientation. In the example illustrated, clip 54 is configured to clip hose cap coupler 52 to blower housing 40 of engine 24 (shown in FIG. 1) above drain port 38. As a result, hose 50 extends upwardly so as to extend away from the ground and any moving parts of implement 20 that may be located below drain port 38, reducing the likelihood of hose 50 becoming caught or dragging on the ground or draining the unit of fluid. By clipping or retaining clip to blower housing 40, clip 54 additionally makes the end 62 of hose 50 more visible and accessible.

In the example illustrated, clip 54 is configured to clip coupler 52 to lower housing 40 in an orientation such that the end opening of fluid passage 80 of clip coupler 52 faces in an upward direction. As a result, should cap 56 not be connected to cap mount 72 or not fully connected to coupler 52, oil or other liquid is less likely to accidentally drain from fluid reservoir 30. In other embodiments, clip 54 may be configured to alternatively clip coupler 52 to other portions of engine 24 or implement 20, at other locations and in alternative orientations. For example, clip 54 may be configured to alternatively mount to engine shields, engine shrouds, decorative shrouds, brackets, the power implement itself such as the frame or other structural members of the implement, a bracket, a tab or provision on a piece of equipment.

As shown in FIG. 3, clip 54 includes curved portions 94, 96, planar surface 98 and resilient portion 100. Curved portion 94 is curved about or extends along a first axis while curved portion 96 is curved about or extends along a second axis spaced from the first axis. Curved portions 94 and 96 extend opposite to planar surface 98 and provide a pair of contact surfaces 102 and 104, respectively. Curved portions 94 and 96 cooperate with planar surface 98 to form a channel 108 having a width less than a width of a flange, plate or other structure upon which clip 54 is to be mounted. In the example illustrated, channel 108 has curved opposite sides at its mouth, facilitating easier mounting of clip 54.

Resilient portion 100 extends between curved portions 94, 96 and planar surface 98. Resilient portion 100 is configured to resiliently flex, permitting one or both of portion 94, 96 and surface 98 to also resiliently flex towards and away from one another to resiliently adjust a width of channel 108. In the example illustrated, resilient portion 100 comprises a cylindrical loop of resilient polymeric material which serves as a spring to resilient bias portions 94, 96 and surface 98 to positions with respect to one another such that channel 108 has a predetermined width. In other embodiments, resilient portion 100 may have other shapes and configurations or may be composed of one or more springs so as to provide the resilient biasing or pinching of portions 94, 96 and surface 98 towards one another.

Figure 4:
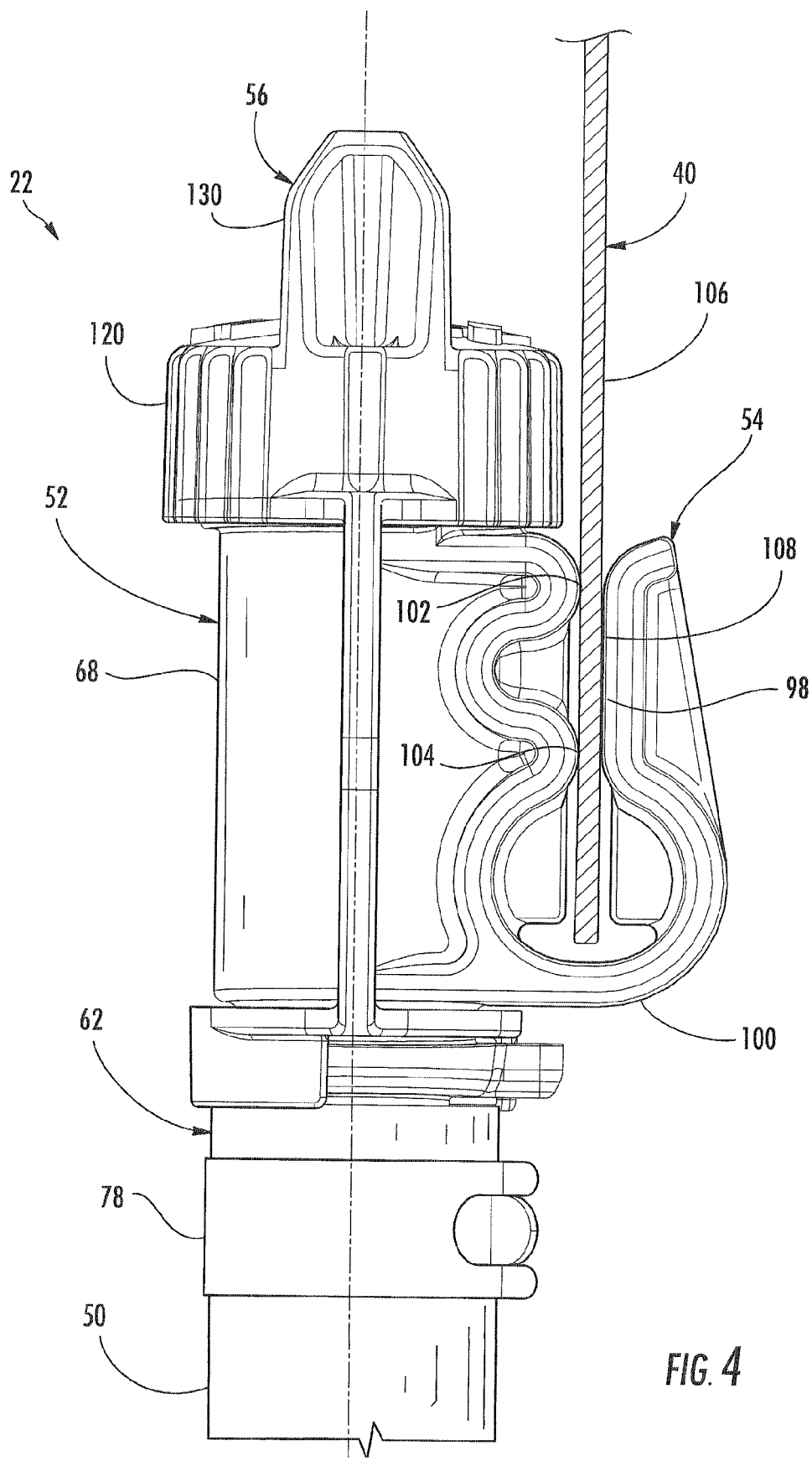
FIG. 4 is a fragmentary side elevational of view of the fluid drain system of FIG. 1 mounted to an engine housing (shown in section) of the implement of FIG. 1.

FIG. 4 illustrates clip 54 clipping or mounting coupler 52 and end 62 of hose 50 to an attachment point such as downwardly extending flange, bracket, plate or wall 106 of the blower housing 40. During insertion of wall 106 into channel 108, planar surface 98 resiliently flex is away from contact points 102 and 104 in a clockwise direction as seen in FIG. 4. Resilient portion 100, serving as a spring, opposes this flexing such that wall 106 is pinched between surface 98 and contact points 102 and 104. Because clip 54 includes a pair of spaced contact points, coupler 52 is more securely retained to wall 106. In other embodiments, clip 54 may have greater or fewer of such contact points. Because channel 108 faces in an upward direction and in the same direction as fluid passage 80 (shown in FIG. 3), coupler 52 may be mounted to a downwardly extending wall 106 of engine 24 or implement 20 while orienting fluid passage 80 of coupler 52 (shown in FIG. 3) in an upwardly facing orientation. Because most housings, shields and the like typically terminate at a downwardly extending wall versus an upwardly extending wall and because clip 54 is configured to mount to a downwardly facing or extending wall 106, clip 54 may be mounted to a larger percentage of engines 24 and implements 20 at a greater number of locations for ease of use. In other embodiments, clip 54 may alternatively be configured to mount to an upwardly extending wall associate with engine 24 or implement 20. In still other embodiments, clip 54 may be configured to mount to a side extending wall. In still other embodiments, clip 54 may comprise a push clip (like a Christmas tree style clip).

Because clip 54 simply pinches wall 106 to releasably and removably mount hose cap coupler to wall 106, clip 54 may be utilized without the use of tools. Clip 54 may be simply attached or detached by manually pushing clip 54 onto or sliding clip 54 off of wall 106. In addition, clip 54 may be utilized to releasably and removably retain hose cap coupler 52 to other structures, at desired locations and in desired orientations. For example, once clip 54 is removed from wall 106 of blower housing 40, clip 54 may be mounted or clipped to a tray, milk jug mouth or another container mouth such that fluid passage 80 is held in position over the container opening through which drained oil/fluid is to pass. As a result, a person does not have to hold end 62 of hose 50 waiting for oil/fluid to be completely drained from reservoir 30. The person may simply attach end 62 of hose 50 to the container with clip 54 and walk away. There is reduced risk of end 62 of hose 50 becoming accidentally dislodged from the container and spilling oil/fluid.

Figure 5:
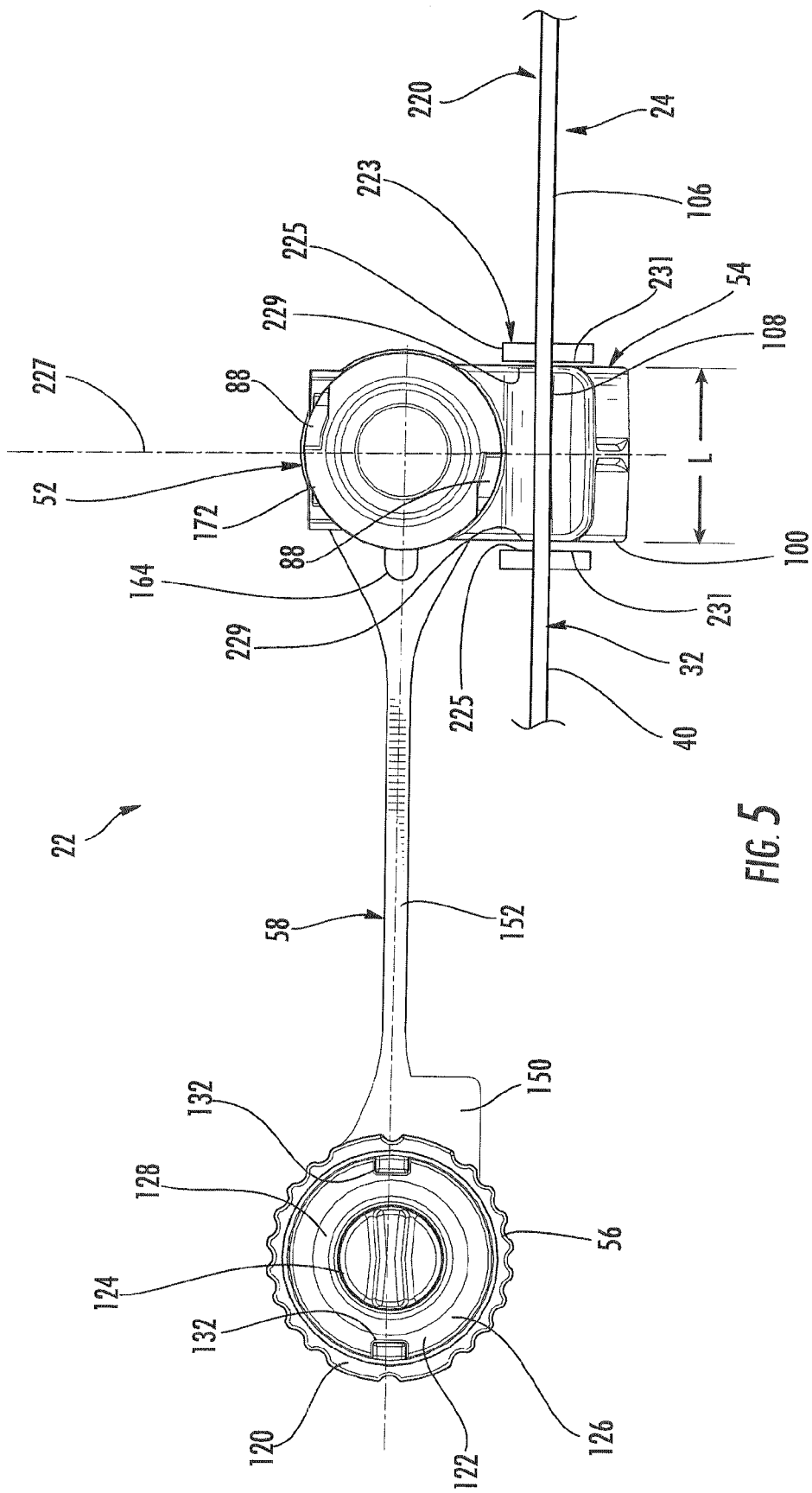
FIG. 5 is a top plan view of the fluid drain system of FIG. 1 mounted to another embodiment of the engine housing of FIG. 4.

FIG. 5 is a top plan view illustrating fluid drain system 22 mounted to implement 220, another embodiment of implement 20. Implement 220 is similar to implement 20 in all respects except that blower housing 40 of engine 24 additionally includes clip mount 223. Those remaining components of implement 220 which correspond to components of implement 20 shown in FIG. 1 are numbered similarly. As shown by FIG. 5, clip mount 223 includes a pair of walls or other surfaces 225 that extend from wall 106 and that are spaced from one another along wall 106 by distance slightly larger than the length L of channel 108 but are sufficiently close to one another so as to inhibit rotation of clip 54 about axis 227. In the embodiment illustrated, surfaces 225 are configured to abut or contact sides 229 of clip 54. Surfaces 225 indicate to a person a preselected mounting location for clip 54. Surfaces 225 further inhibit sliding, relative rotation or slippage of clip 54 with respect to wall 106. As a result, clip 54 is less likely to become dislodged or otherwise moved or rotated to an undesirable location or an undesirable orientation.

In the example illustrated, surfaces 225 are illustrated as comprising tabs or projections extending from an outer surface of wall 106. In other embodiments, surfaces 225 may be formed by outwardly deforming portions of wall 106, itself, such as by providing bends in wall 106. In the example illustrated, surfaces 225 are integrally formed as a single unitary body with wall 106. In other embodiments, surfaces 225 may be provided by one or more structures fastened, clipped, mounted, welded or otherwise connected to wall 106.

Because surfaces 225 extend on an outer side of wall 106, surfaces 225 extend between channel 108 and coupler 52. As shown by broken lines in FIG. 5, in other embodiments, implement 220 may additionally or alternatively be provided with surfaces 231 on inside surface (the side of wall 106 between wall 106 and the remainder of engine 24). Surfaces 231 may be identical in all respects to surfaces 225 except that surface 231 are on the inner side or surface of wall 106. Like surfaces 225, surfaces 231 inhibit undesirable slippage of clip 54. In other embodiments, surfaces 225 and/or 231 may be omitted.

As shown by FIGS. 2 and 4, coupler 52 and clip 54 are integrally formed as a single unitary body. As a result, tolerance stack (the assembly of multiple distinct parts, where each part has its own tolerances which contribute to the total tolerance variation of an assembly) of the various parts of coupler 52 and clip 54 is reduced. In addition, assembly costs are further reduced. In the example illustrated, coupler 52 and clip 54 are integrally formed as a single unitary body out of a molded polymer or plastic such as polyethyleneteraphalate (PET), Nylon and the like. In other embodiments, coupler 52 and clip 54 may be formed from one or more metals.

In the example illustrated, coupler 52 and clip 54 are molded from one or more polymers having yellow pigments or additives so as to be yellow in color. The yellow color is more readily seen and identified by a person as a portion of engine 24 for the draining of oil from engine 24. In other words, yellow color indicates to the person that this portion of fluid drain system 22 is to be used for the draining of oil. In other embodiments, clip 54 may alternatively be mounted, fastened, clamped, welded or bonded to coupler 52. In other embodiments, clip 54 may alternatively be mounted, fastened, clamped, welded or bonded to, or integrally formed as part of a unitary body with cap 56. In other embodiments, coupler 52 and clip 54 may be formed from different materials as compared one another, may be made from other materials, may other configurations and may have other colors.

Figure 6:
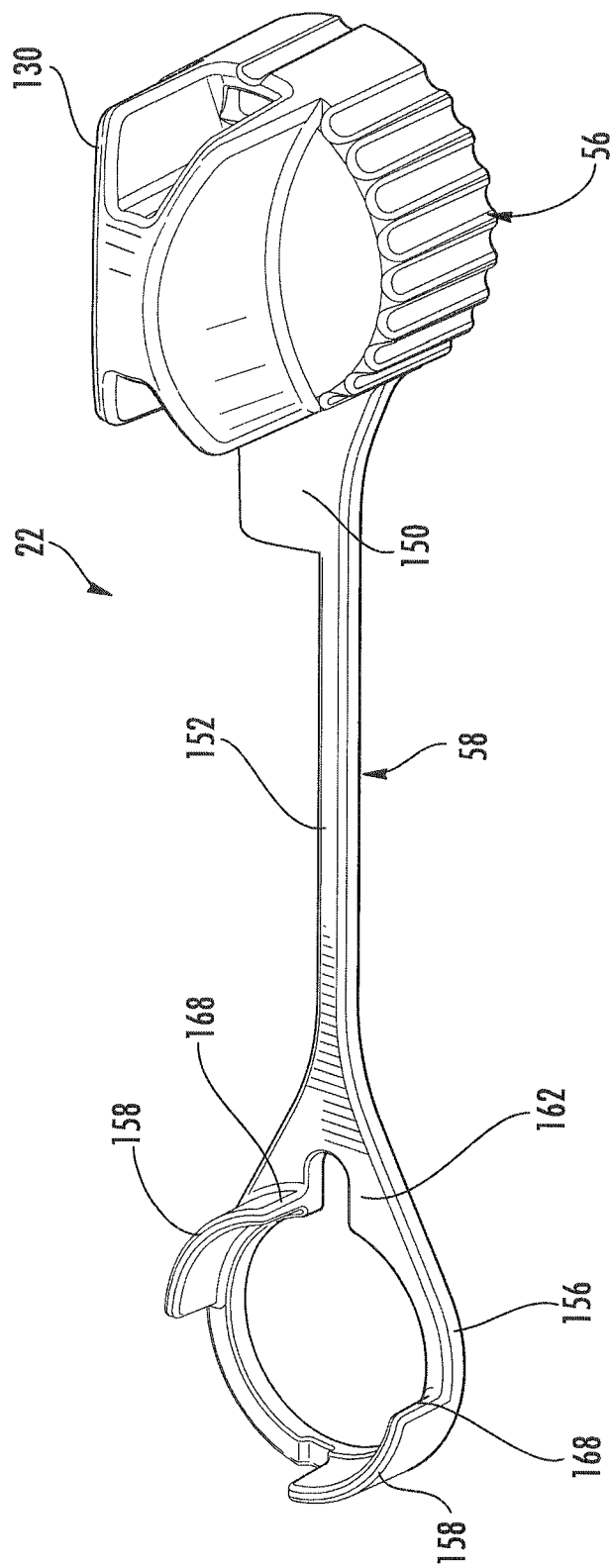
FIG. 6 is a top perspective view of a cap and tether of the fluid drain system of FIG. 1.

FIGS. 2 and 6 illustrate cap 56 and tether 58 separated from hose cap coupler 52. As shown by such figures, cap 56 and tether 58 are integrally formed a single unitary body. In the example illustrated, cap 56 and tether 58 are integrally formed as a single unitary body by molding one of more polymers. As a result, fabrication and assembly costs are reduced. In the example illustrated, cap 56 and tether 58 are molded from one or more polymers, such as polyethyleneteraphalate (PET), Nylon and the like having yellow pigments or additives so as to be yellow in color. The yellow color is more readily seen and identified by a person as a portion of engine 24 for the draining of oil from engine 24. In other words, yellow color indicates to the person that this portion of fluid drain system 22 is to be used for the draining of oil. In other embodiments, cap 56 may alternatively be mounted, fastened, clamped, welded or bonded to tether 58. In other embodiments, cap 56 and tether 58 may be formed from different materials as compared one another may be made from other materials, may other configurations and may have other colors. In some embodiments, tether 58 may be omitted.

As shown by FIG. 3, cap 56 includes an annular ring 120, a floor 122 and hub 124 forming a channel 126, an o-ring 128, handle portion 130 and a pair of opposing projections 132. The channel 126 formed by ring 120, floor 122 and hub 124 is configured to receive cap mount 72 when projections 132 are aligned with axis openings 88. In the example illustrated, ring 120 includes serrations 136 which facilitate rotation of cap 56 without tools. Handle 130 projects from an opposite side of floor 122 (the top of cap 56) to further facilitate grasping and rotation of cap 56. O-ring 128 extends about hub 124 and is configured to be compressed against an end of cap mount 72 facilitate the formation of a fluid seal between cap 56 and coupler 52. In other embodiments, other gaskets or sealing structures may be utilized in place of o-ring 128. In still other embodiments, the sealing surfaces may be provided as part of the structure forming cap 56.

Figure 7:
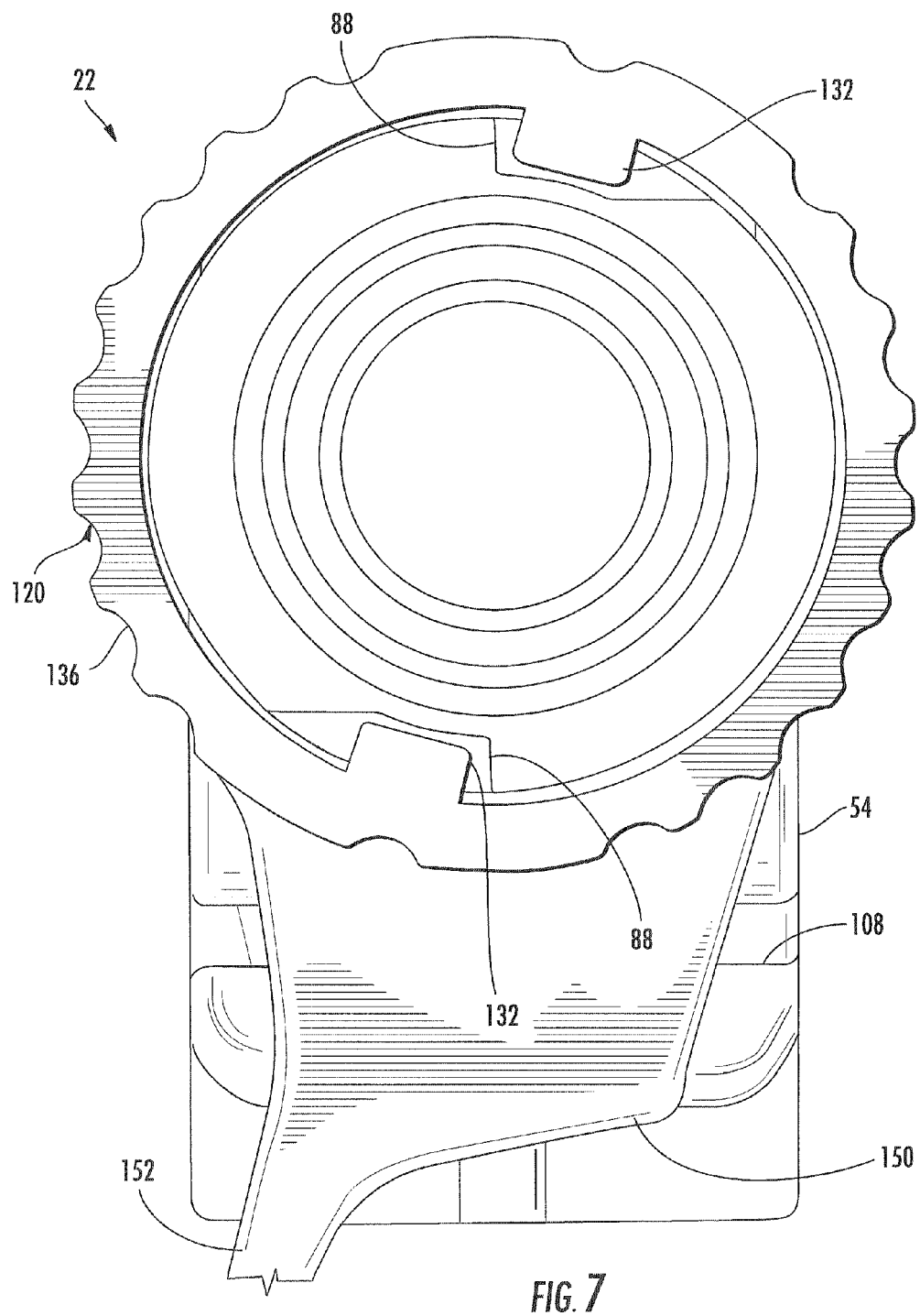
FIG. 7 is a sectional view of the fluid drain system of FIG. 1 illustrating positioning of the cap onto the hose cap coupler.
Figure 8:
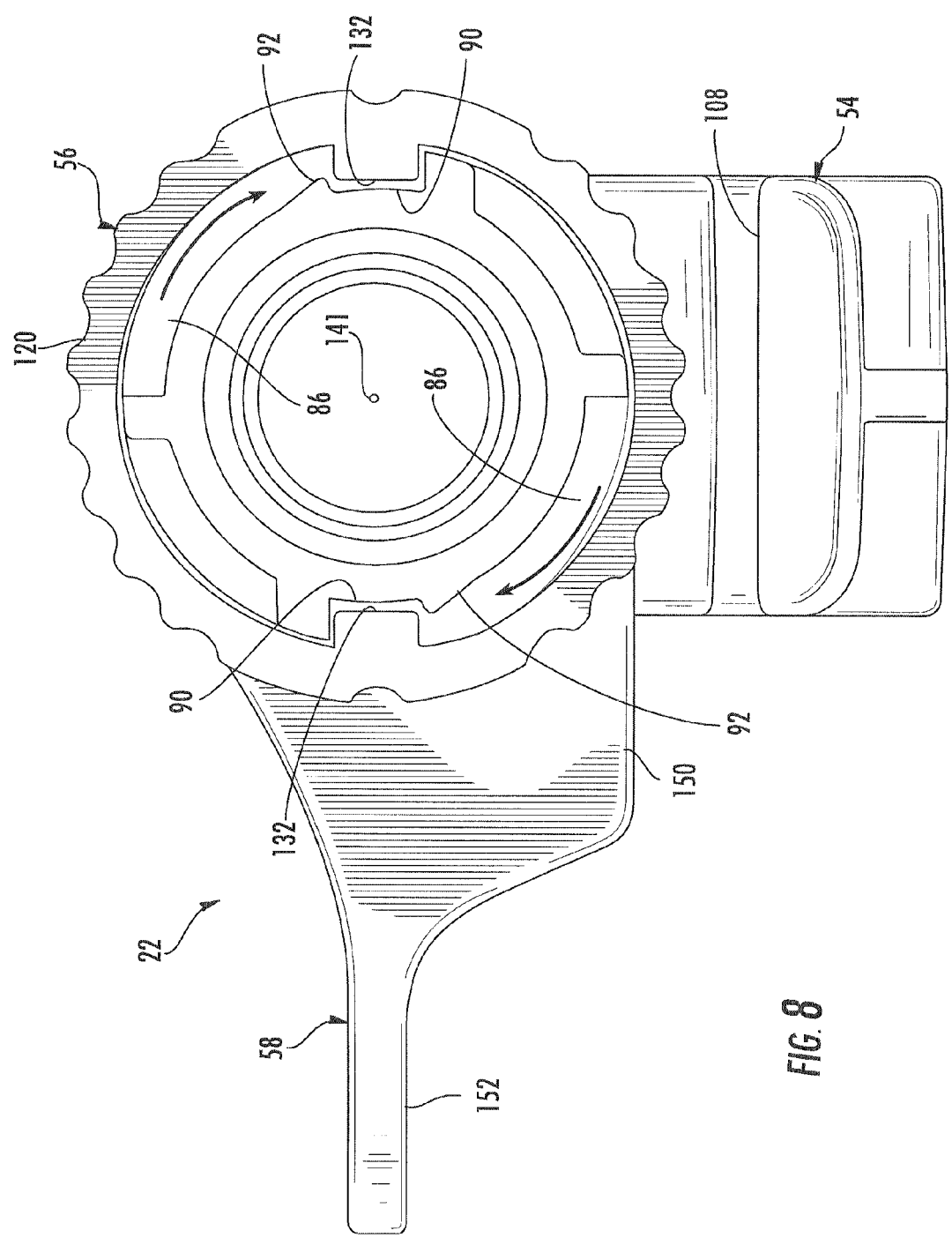
FIG. 8 is a sectional view of the fluid drain system of FIG. 1 illustrating rotation of the cap on the cap coupler to a locked position on the cap coupler.

Projections 132 extend from ring 120 into channel 126. Projections 132 inhibit axial movement of cap 56 away from coupler 52. Projections 132 further cooperate with the detent 90 and ramp 92 to inhibit rotation of cap 56 and accidental withdrawal of projections 132 from channels 86. FIGS. 7 and 8 illustrate mounting of cap 56 to cap coupler 52.

As shown by FIG. 7, a sectional view through cap 56 during mounting of cap 56 onto cap coupler 72, projections 132 are initially aligned and passed through access openings 88 into channels 86 (shown in FIG. 3). As shown by FIG. 8, cap 56 is rotated in a clockwise direction about axis 141. During such rotation, projections 132 ride up and over ramps 92 before dropping into detents 90. As projections 132 ride over ramps 92, one or more of cap mount 72, ring 120 or projections 132 resiliently flex. As a result, a person receives a unique tactile feel as projections 132 snap or pop into detents 90. In some embodiments, this may also produce an audible sound. This tactile feel or audible sound provides a person with the assurance that cap 56 has been completely secured and retained on cap coupler 52.

Figure 9:
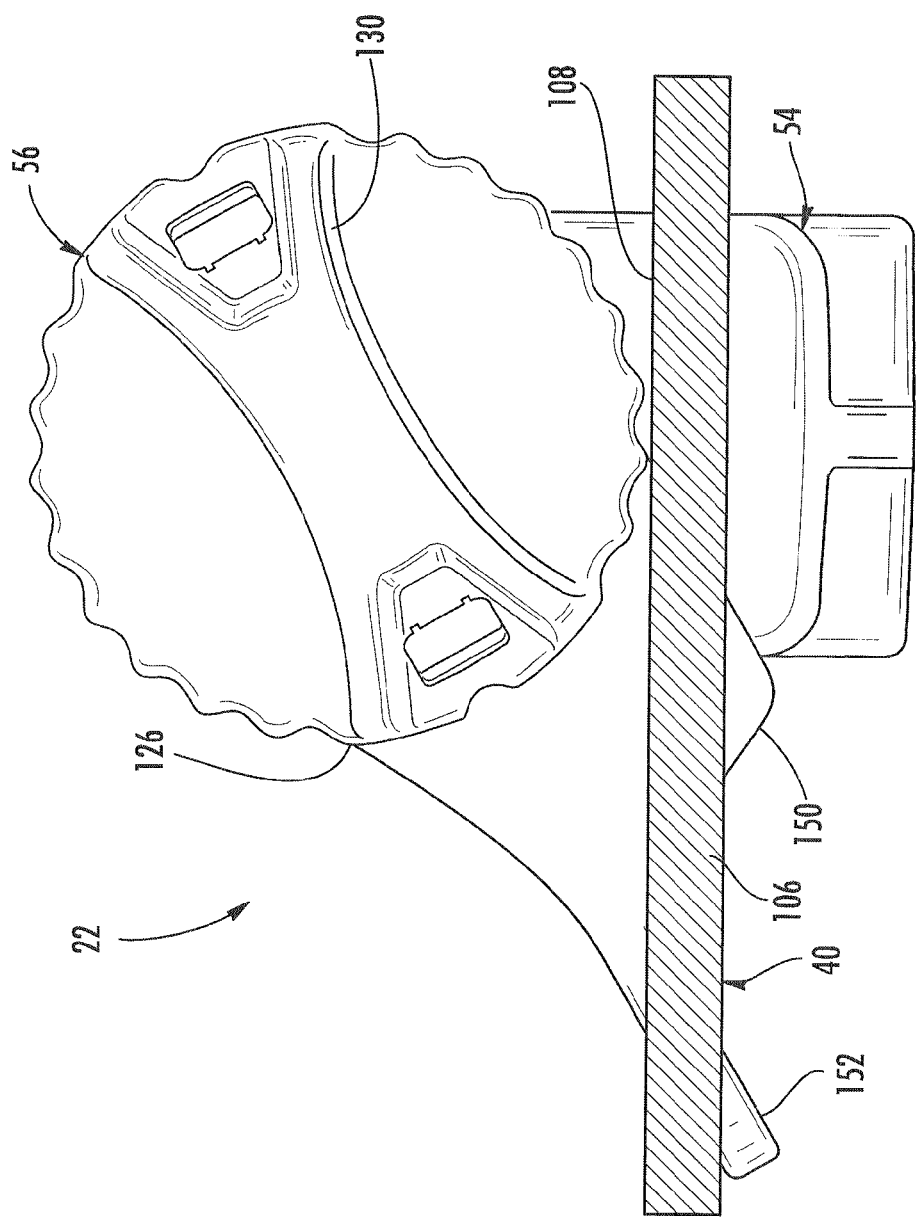
FIG. 9 is a top plan view of the fluid drain system of FIG. 1 illustrating the tether blocking a clip channel when the cap is not fully closed.

In addition to providing a tactile feel and audible sound when cap 56 has been completely secured on cap coupler 52, ramps 92 also serve to inhibit accidental rotation of cap 56 and disconnection of cap 56 from coupler 52. Cap 56 may be removed from cap coupler 52 by rotating cap 56 in a reverse direction (counterclockwise as seen in FIG. 9). During such removal, manual force is sufficient to flex cap mount 72 or ring 120 a sufficient distance to move projections 132 past ramps 92. Although ramps 92 are illustrated as having a gradual incline, in other embodiments, ramps 92 may be more akin to speed bumps or other blocking surfaces. In yet other embodiments, ramps 92 may be omitted. In still other embodiments, other structures may be used for securing cap 56 on coupler 52. For example, cap 56 may alternatively be mounted to coupler 52 by being threaded on, with a push lock design, or with locking tab features. In some embodiments, cap 56 may have opposing sidewalls that are offset 90 degrees from projections 132 and that are sufficiently resiliently flexible so as to be manually squeezable towards one another to move projections 132 outward from detents 90, allowing the cap 56 to be rotated and unscrewed or otherwise separated from coupler 52.

Figure 10:
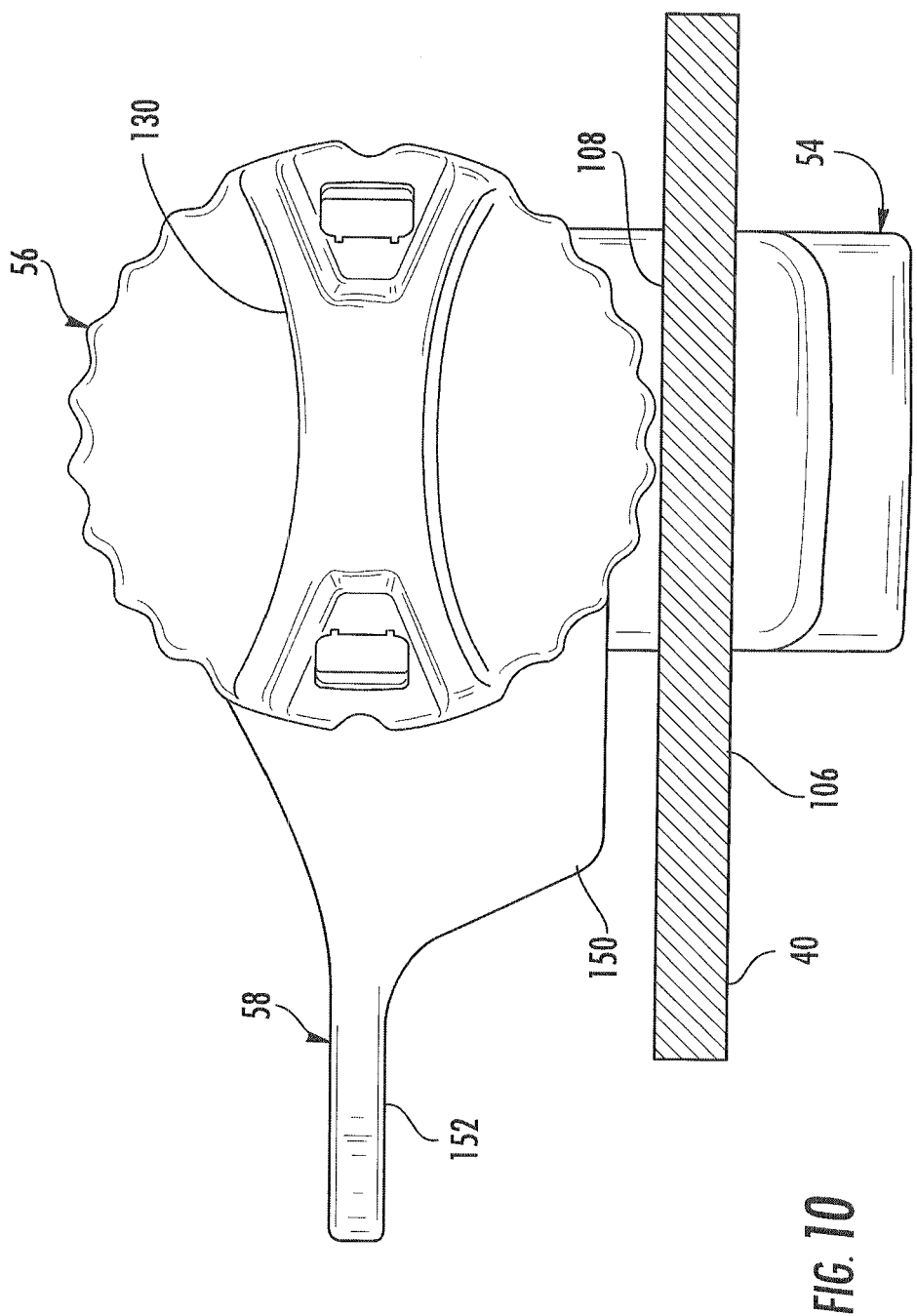
FIG. 10 is a top plan view of the fluid drain system of FIG. 1 illustrating the tether offset from the clip channel when the cap is fully closed.

As shown by FIG. 6, tether 58 extends from cap 56 and is configured to connect cap 56 to hose cap coupler 52 even when cap 56 is disconnected from cap mount 72. Tether 58 prevents cap 56 from becoming separated from end of 62 of hose 50 and from becoming lost or misplaced. Tether 58 includes base tab 150, extension 152, ring 156, and stop walls 158. As best shown by FIGS. 9 and 10, base tab 150 extends from ring 120 of cap 56 between cap 56 and extension 152. Tab 150 rotates with the rotation of cap 56. Tab 150 is configured to have a width or dimension such that tab 150 extends over channel 108 of clip 54 when cap 56 is not fully closed or tight. In the example embodiment illustrated, tab 150 extends over channel 108 when projections 132 are not completely rotated through channels 86 and over ramps 92 into detents 90. In the position shown in FIG. 9 in which tab 150 extends over at least a portion of channel 108, tab 150 inhibits or prevents insertion of wall 106 of blower housing 40 into channel 108. As a result, cap coupler 92 and end 62 of hose 50 cannot be mounted to engine 24 with cap 56 not fully closed.

However, as shown in FIG. 10, when cap 56 is fully rotated to the closed position in which projections 132 are located in detents 90 (shown in FIG. 3), tab 150 is out of the way of channel 108 so as to not extend over channel 108. As a result, wall 106 of blower housing 40 may be inserted into channel 108 to mount cap coupler 52 and end 62 of hose 50 using clip 54. Although tab 150 is described as being associated with tether 58, in other embodiments where tether 58 is omitted, tab 150 may still be provided as part of cap 56. In other embodiments, tab 150 may be omitted.

Extension 58 comprises an elongated flexible or bendable member extending between tab 150 and ring 156. For purposes of this disclosure, the term flexible or bendable means that a member may be bent or deformed to an extent visible by a human eye using a manually applied force of an average person. Extension 58 is sufficiently long and flexible such that cap 56 may be moved from the position shown in FIG. 3 to the position shown in FIGS. 1 and 4 in which cap 56 is mounted on cap coupler 52.

As shown by FIG. 6, ring 156 comprises a ring having a cut out or notch 162. Notch 162 is located between stop walls 158. Notch 162 is configured to permit passage of projection 164 of tether mount 74 to position projection 164 circumferentially between stop walls 158 on an opposite side of ring 156 has fitting 66 and hose 50.

Stop walls 158 comprise walls extending from ring 156 that provide stop surfaces 168 on opposite sides of notch 162. Stop surfaces 168 are configured to limit movement of projection 164 (shown in FIG. 11) so as to limit relative rotation of tether 58 and cap 56 about cap coupler 52. In the example illustrated, stop surfaces 168 limit such relative rotation of tether 58 relative to coupler 52 to less than 360 degrees and preferably less than 180 degrees. In the embodiment shown, rotation is limited to approximately 90 degrees. In other embodiments, other structures having other configurations may alternatively be used to provide stop surfaces 168. It still other embodiments, this arrangement may be reversed, wherein tether 58 includes a projection and wherein tether mount 74 includes at least one stop surface to control or limit relative rotation of tether 58 with respect to cap coupler 52.

Figure 11:
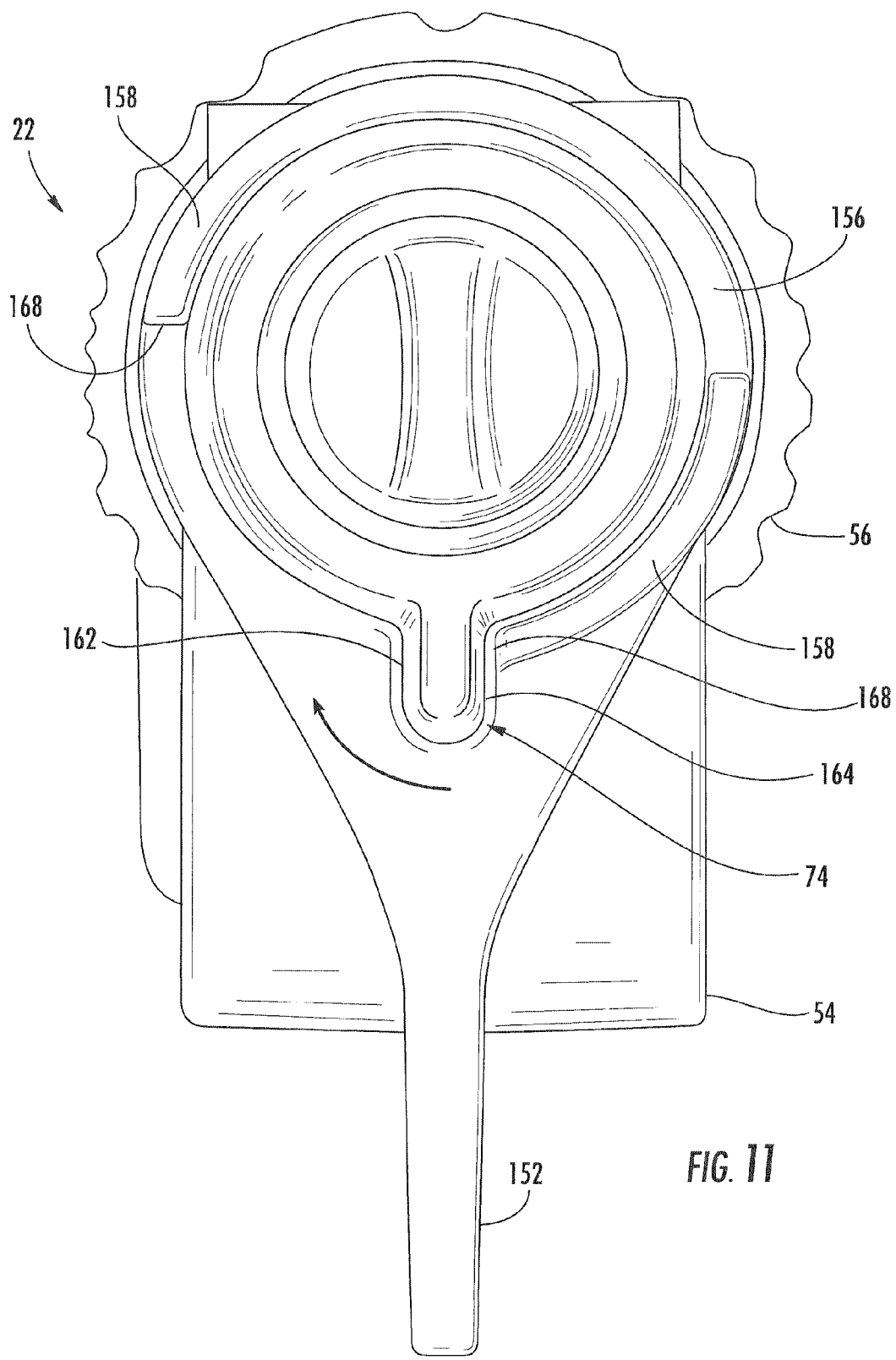
FIG. 11 is a bottom plan view of the fluid drain system of FIG. 1 illustrating attachment of the tether to the hose cap coupler.
Figure 12:
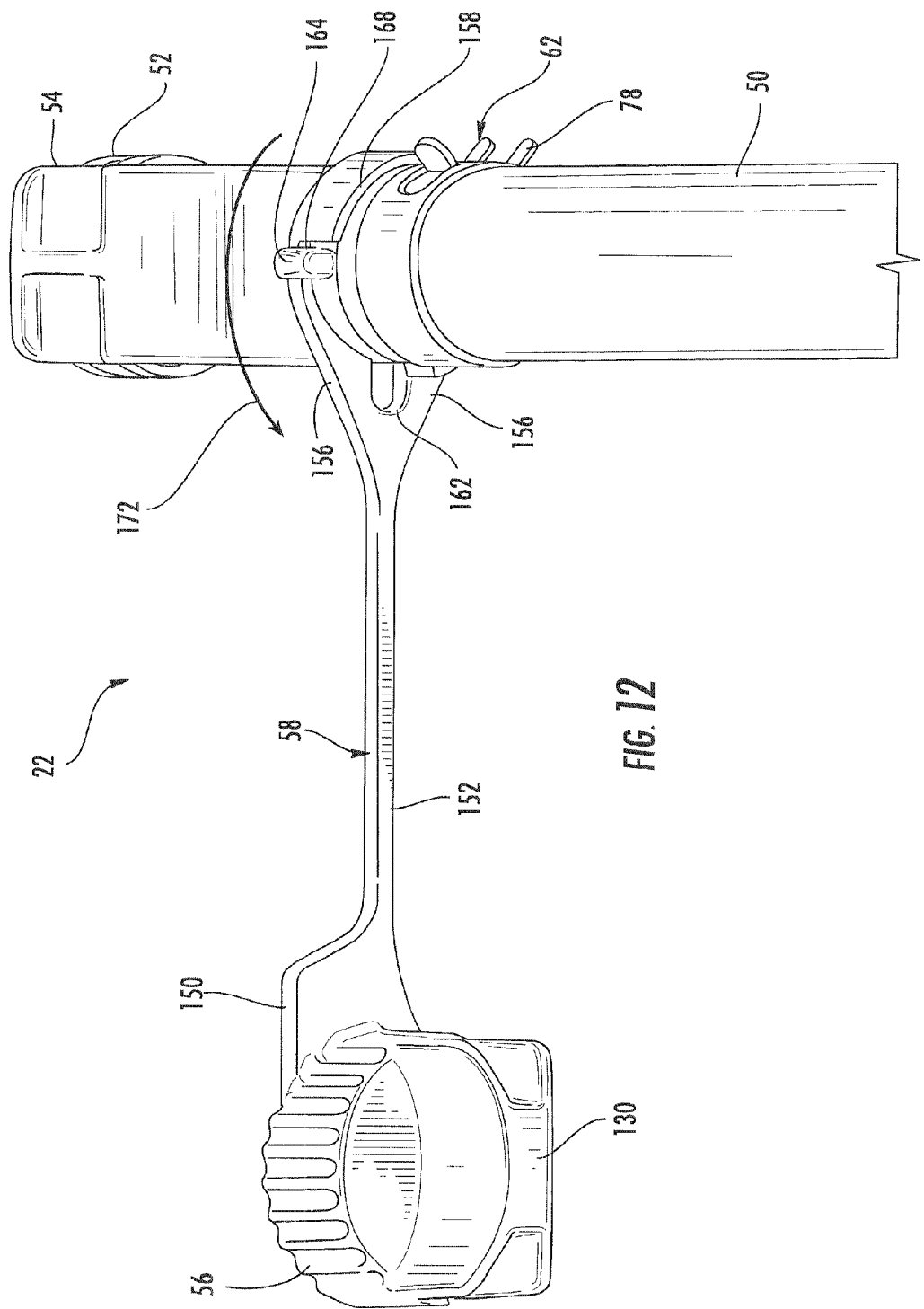
FIG. 12 is a rear perspective view of the fluid drain system of FIG. 1 illustrating positioning of the cap when detached from an end of the hose cap coupler.
Figure 13:
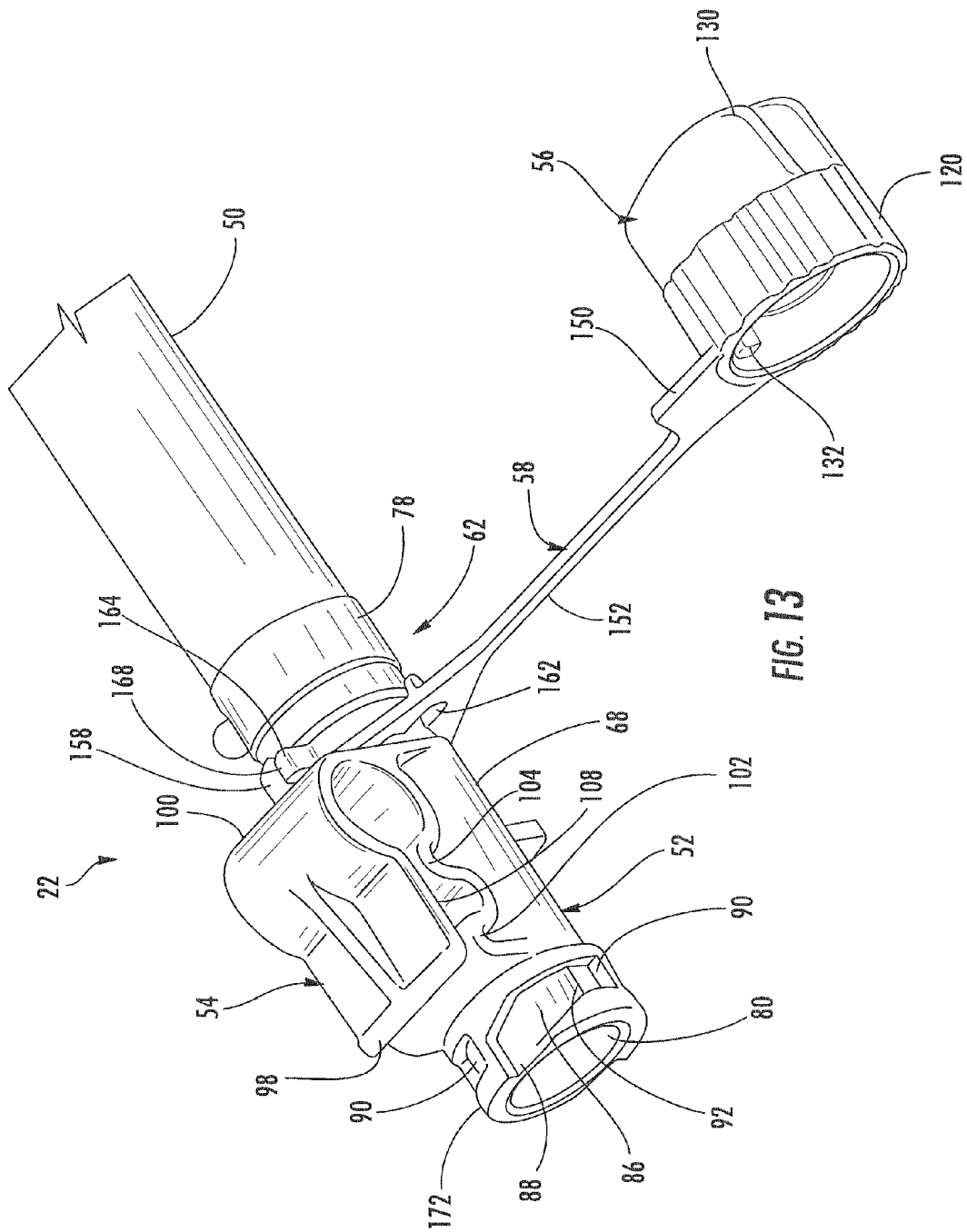
FIG. 13 is a front perspective view of the fluid drain system of FIG. 1 illustrating positioning of the cap when detached from an end of the hose cap coupler.

FIGS. 11-13 illustrate the mounting of cap 56 and tether 58 to cap coupler 52 and the functioning of projection 164 and stop surfaces 168 to limit rotation of tether 58 and cap 56. FIGS. 2 and 11 illustrate initial mounting of tether 58 onto cap coupler 52. Initially, tether 58 is position in the orientation shown in FIG. 2 opposite to cap coupler 52. Cap 56 and tether 58 are further oriented source to align projection 164 and notch 162 as shown in FIG. 11. Fitting 66 is passed through ring 62. In one embodiment, ring 156 maybe sized such that it stretches or resiliently flexes as it is axially moved into channel 93. Once within channel 93, ring 156 returns to its original shape, wherein ring 156 is captured within groove 93 and wherein projection 164 is captured between stop surfaces 168. As a result, projection 164 can no longer pass through notch 162 unless sufficiently strong manual force is applied to ring 156.

FIGS. 12 and 13 illustrate cap 56 separated from the end of cap coupler 52 and left to hang or dangle such as when oil or other fluid is being poured from the end of cap coupler 52. As shown by FIG. 12, when cap 56 is left to hang, cap 56 falls under the force of gravity, rotating tether 58 and it's ring 156 in the direction indicated by arrow 172. Such rotation continues until projection 164 contacts or abuts stop surface 168 provided by stop wall 158. As shown by FIG. 13, cap 56 and tether 58 are suspended to a side of cap coupler 52 with clip 54 extending above or along a top of cap coupler 52. As a result, projection 164 abuts stop surface 168 to prevent tether 58 from falling and rotating to an orientation in which tether 58 extends from cap coupler 52 in a direction opposite to clip 54.

In other words, tether 58 is prevented from being offset 180 degrees from clip 54 with respect to cap coupler 52. Because tether 58 and cap 56 extend to a side of cap coupler 52, rather than below cap coupler 52 (when clip 54 is on top of cap coupler 52), tether 58 is less likely to bend and position cap 56 below cap coupler 52 and beyond the end of fluid passage 80 where cap 56 might otherwise intercept the oil or fluid stream during draining of liquid or oil from fluid passage 80. In simple terms, projection 164 and stop surface 168 keep cap 56 out of the way during draining of oil/fluid. In other embodiments, projection 164 and stop surface 158 may be omitted.

Figure 14:
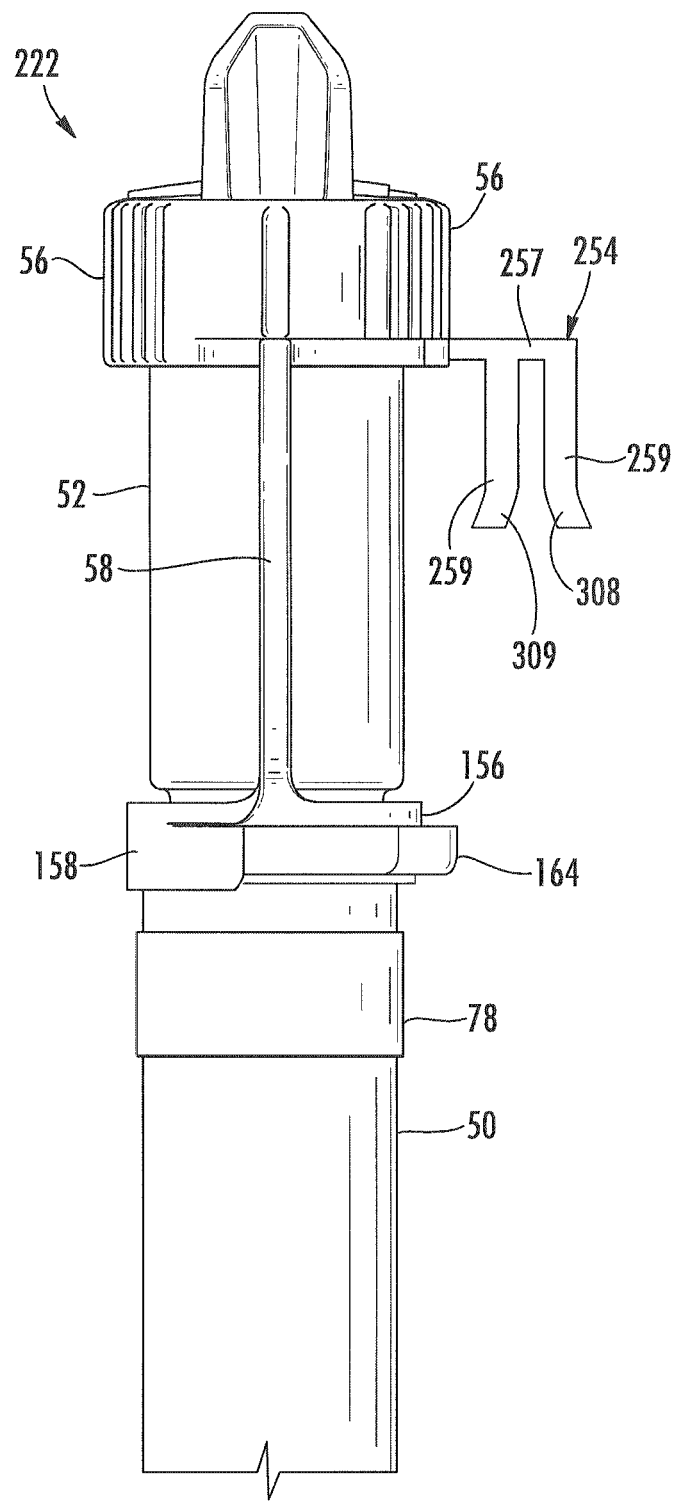
FIG. 14 is a side elevational view of another embodiment of the fluid drain system of FIG. 1 according to an example embodiment.
Figure 15:
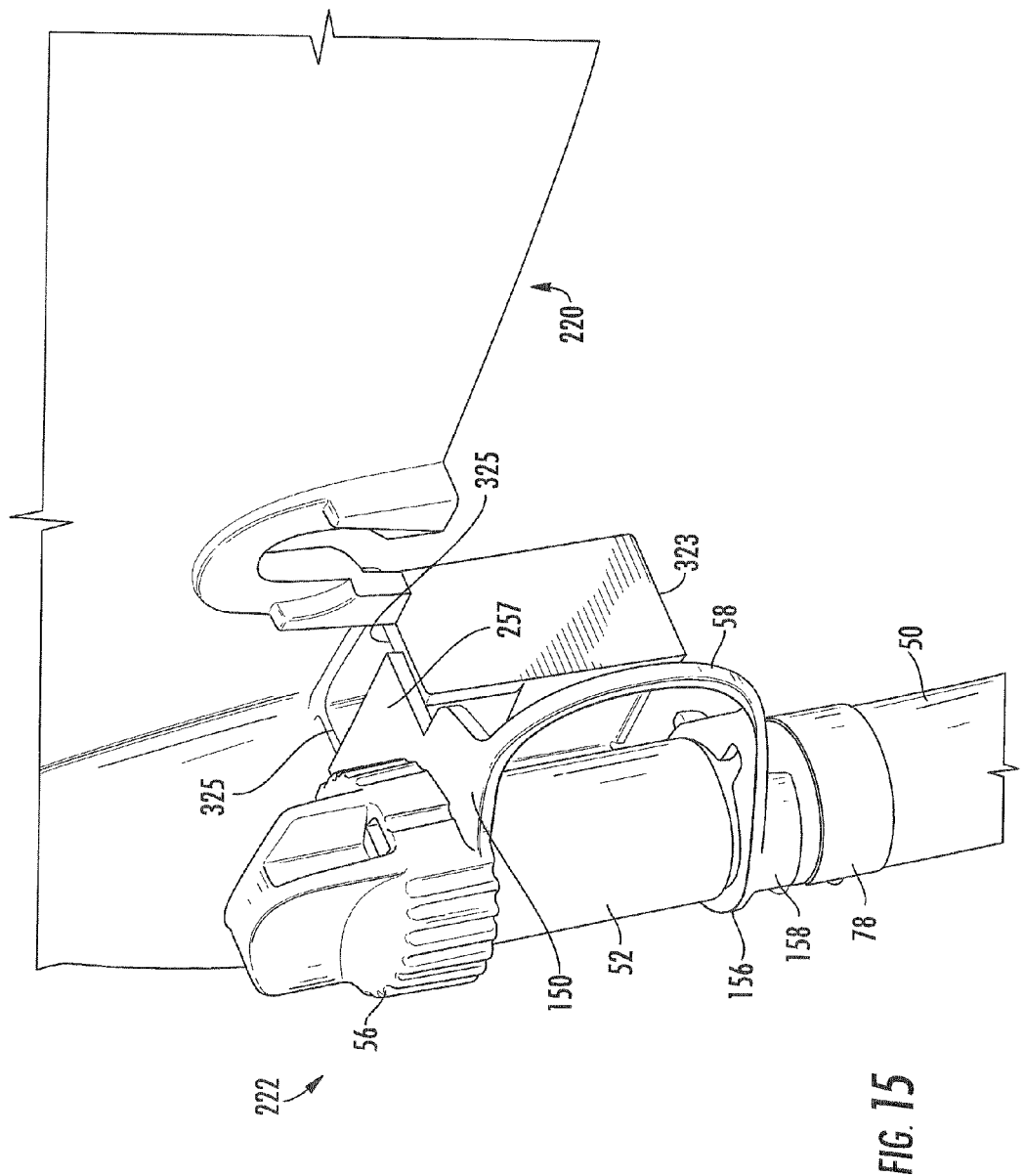
FIG. 15 is a side perspective view of the fluid drain system of FIG. 14 mounted to another embodiment of an implement.
Figure 16:
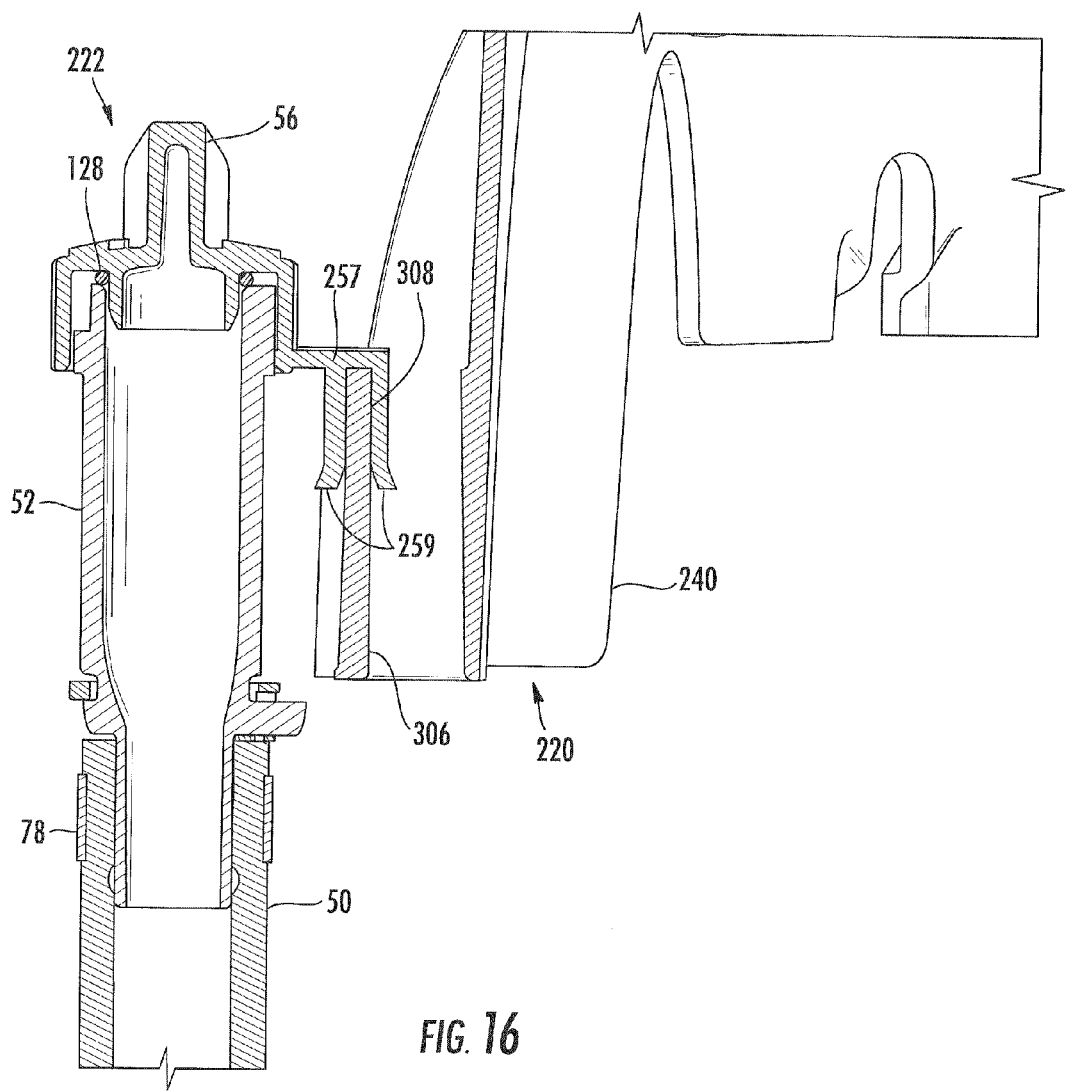
FIG. 16 is a sectional view of the fluid drain system and implement of FIG. 15.

FIGS. 14-16 illustrate fluid drain system 222, another embodiment of fluid drain system 22. FIGS. 15 and 16 illustrate so drain system 222 mounted to power implement 220, another embodiment of implement 20. Fluid drain system 222 is similar to fluid drain system 22 except that fluid drain system 222 includes clip 254 in place of clip 54. Unlike clip 54, clip 254 extends from and is connected to cap 56. In the example illustrated, clip 254 is integrally formed as part of a single unitary body with cap 56. In other embodiments, clip 254 may be mounted, fastened, welded, bonded or is joined to cap 56.

As shown by FIG. 14, clip 254 includes an outwardly extending hanger 257 and a pair of opposite walls 259 which form an upwardly extending channel 308. Channel 308 is configured to receive an upwardly extending wall so as to hang fluid drain system 222 in an upwardly facing vertical orientation. In the example illustrated, walls 259 outwardly extend away from one another to provide a wider mouth 309 for channel 308 to facilitate easier mounting of clip 254. In other embodiments, this wider mouth may be omitted.

In one embodiment, channel 308 has a width slightly less than a width of the wall to be received. In such an embodiment, walls 259 are formed from one or more materials so as to resiliently flex away from one another during insertion of the wall and to pinch the received wall to better secure clip 254 on such a wall. In other embodiments, walls 259 may be rigid and channel 308 maybe slightly larger than the wall to be received.

FIGS. 15 and 16 illustrate clip 254 mounting fluid drain system 222 onto implement 220. In one embodiment, clip 254 mounts fluid drain system 222 to a housing of an engine, such as a blower housing 240. In other embodiments, clip 254 may mount fluid drain system 222 to other structures of an implement 220. In the example illustrated, blower housing 240 includes an upwardly extending wall 306 which is removably received within channel 308. In other embodiments, clip 254 may alternatively include walls 259 extending upwardly from hanger 257 so as to form an upwardly facing channel. In such an embodiment, clip 254 may alternatively mount to a downwardly extending wall similar to wall 106 (shown in FIG. 4).

As shown by FIG. 15, housing 240 additionally includes clip mount 323. Clip mount 323 includes a pair of walls or other surfaces 325 that extend from wall 306 and that are spaced from one another along wall 306 by distance slightly larger than the length of channel 308 but are sufficiently close to one another so as to inhibit rotation of clip 254. In the embodiment illustrated, surfaces 325 are configured to abut or contact sides of clip 254. Surfaces 325 indicate to a person a preselected mounting location for clip 254. Surfaces 325 further inhibit sliding, relative rotation or slippage of clip 254 with respect to wall 306. As a result, clip 254 is less likely to become dislodged or otherwise moved or rotated to an undesirable location or an undesirable orientation. In other embodiments, clip mount 323 may be omitted.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An apparatus comprising:
 a hose cap coupler for being coupled to and carried by an end of a hose;
 a cap removably coupled to the cap coupler, the cap having mouth receiving the coupler; and
 a clip supported by at least one of the cap and the coupler, the clip being configured to resiliently flex to resiliently capture and retain an attachment point within an opening of the clip, wherein the coupler includes a fluid passage having a port facing in a first direction, wherein the clip has a channel opening in the first direction and wherein the mouth of the cap is located beyond the channel opening in the first direction when the cap is removably coupled to the hose cap coupler.

2. The apparatus of claim 1 further comprising a tether having a first end connected to the coupler and a second end connected to the cap.

3. The apparatus of claim 2, wherein the coupler includes a fluid passage having an axial centerline, wherein the tether is configured to rotate to at least some non-zero degree relative to the coupler about the axial centerline of the fluid passage of the coupler, and wherein such rotation is limited to a maximum extent of less than 360° while the cap is separated from the coupler.

4. The apparatus of claim 3, wherein one of the coupler and the tether includes an annular notch circumferentially extending between a pair of stop surfaces, wherein the other of the coupler and the tether includes a projection radially projecting into the annular notch and wherein the stop surfaces and the projection cooperate to limit rotation of the tether.

5. The apparatus of claim 2, wherein the coupler includes a fluid passage having an axial centerline, wherein the tether is configured to rotate to at least some non-zero degree relative to the coupler about the axial centerline of the fluid passage of the coupler, and wherein such rotation is limited to a maximum extent of less than 180° while the cap is separated from the coupler.

6. The apparatus of claim 1, wherein the coupler includes a fluid passage configured to align with a hose fluid passage.

7. The apparatus of claim 1, wherein the clip is integrally formed as a single unitary body with the coupler.

8. The apparatus of claim 1, wherein the coupler includes a circumferential channel having an axial access opening and a detent and wherein the cap includes a projection configured to pass through the access opening, to slide within the channel and to be received within the detent.

9. The apparatus of claim 8 further comprising a ramp adjacent to the detent, wherein at least one of the coupler and the cap resiliently flex, as the projection slides up the ramp, in an outward radial direction before radially dropping into the detent to snap the projection over and past the ramp.

10. The apparatus of claim 1, wherein the clip comprises:
 a first contact surface with the attachment point; and
 a second contact surface with the attachment point.

11. The apparatus of claim 10, wherein the clip further comprises a substantially planar surface opposite the first contact surface and the second contact surface.

12. The apparatus of claim 11, wherein the clip is integrally formed as a single unitary body.

13. The apparatus of claim 12, wherein the coupler includes a port extending along an axis, wherein the cap includes a projection and wherein the cap is rotatable about the axis while connected to the coupler between a first position in which the projection is withdrawn from a channel opening of the clip to a second position in which the projection blocks the channel opening of the clip when the cap is not sufficiently rotated into connection with the coupler.

14. The apparatus of claim 10, wherein the first contact surface and the second contact surface are each curved.

15. The apparatus of claim 1 further comprising a clip mount coupled to the attachment point, the clip mount including a first wall configured to extend proximate a side of the clip when the clip is mounted to the attachment point to limit movement of the clip.

16. The apparatus of claim 15, wherein the clip mount includes a second wall spaced from the first wall to form a channel receiving the clip, wherein the second wall is configured to inhibit rotation of the clip within the channel.

17. The apparatus of claim 1, wherein the coupler, the clip and the cap are each formed from a yellow polymer.

18. The apparatus of claim 1 further comprising:
 an engine having an oil reservoir; and
 a hose having a first end connected to the oil reservoir and a second end connected to the coupler.

19. The apparatus of claim 18, wherein the second end of the hose extends upwardly from the first end when the clip is secured to the engine.

20. The apparatus of claim 1, wherein the hose cap coupler is configured to fit within a bottle opening while the clip clasps about a mouth of the bottle opening.

21. The apparatus of claim 1, wherein the clip is configured to removably couple with a blower housing.

22. The apparatus of claim 1, wherein the attachment point is provided on at least one of an engine or a powered implement.

23. An apparatus comprising:
 an engine having an oil reservoir;
 a hose having a hose fluid passage, a first end connected to the oil reservoir and a second end;
 a hose cap coupler connected to the second end of the hose, wherein the coupler includes a fluid passage configured to align with the hose fluid passage;
 a cap removably coupled to the hose cap coupler; and
 a clip supported by the coupler and configured to retain the cap coupler to the engine, wherein the coupler includes a fluid passage having a port facing in a first direction and wherein the clip has a channel opening in the first direction, and wherein the clip comprises:
 a first wall;
 a second wall opposing the first wall and spaced from the first wall to form a channel between the first wall the second wall, the channel having a mouth to receive a portion of the engine; and
 a resilient portion interconnecting the first wall and the second wall, the resilient portion forming a floor of the channel, wherein the first wall extends alongside the fluid passage and is integrally connected to the fluid coupler at the mouth of the clip and at the floor of the clip such that a side of the coupler forming the fluid passage rigidifies the first wall of the clip; and a tether having a first end connected to the coupler and a second end connected to the cap.

24. An apparatus comprising:

a hose cap coupler;

a cap removably coupled to the cap coupler; and a clip supported by at least one of the cap and the coupler and configured to retain the cap coupler to an attachment point, wherein the coupler includes a fluid passage having a port facing in a first direction and wherein the clip has a channel opening in the first direction, wherein the clip comprises:

a first wall;

a second wall opposing the first wall and spaced from the first wall to form a channel between the first wall the second wall, the channel having a mouth to receive a portion of the engine; and a resilient portion interconnecting the first wall and the second wall, the resilient portion forming a floor of the channel, wherein the first wall extends alongside the fluid passage and is integrally connected to the fluid coupler at the mouth of the clip and at the floor of the clip such that a side of the coupler forming the fluid passage rigidifies the first wall of the clip.

\* \* \* \* \*